Jan. 26, 1932.    W. L. McNAMARA    1,842,912
LEER LOADER
Filed Aug. 6, 1928    3 Sheets-Sheet 1

Jan. 26, 1932.   W. L. McNAMARA   1,842,912
LEER LOADER
Filed Aug. 6, 1928   3 Sheets-Sheet 2

Jan. 26, 1932.   W. L. McNAMARA   1,842,912
LEER LOADER
Filed Aug. 6, 1928   3 Sheets-Sheet 3

Patented Jan. 26, 1932

1,842,912

UNITED STATES PATENT OFFICE

WILLIAM L. McNAMARA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE

LEER LOADER

Application filed August 6, 1928. Serial No. 297,661.

The present invention relates to transferring devices and more particularly to a device for transferring vessels or other glassware from a conveyor to an annealing leer.

In the manufacture of glassware such as containers for food products and the like, molten glass is delivered from a furnace in gobs to a fabricating machine which presses or blows the articles into the desired form and delivers them very hot. If such articles are permitted to cool in the open atmosphere, the strains developed due to unequal expansion and contraction are such that the vessels are extremely fragile and cannot be subjected to changing temperatures. In order to eliminate these strains the ware is subjected to heat treatment commonly known as annealing during which the vessels are heated up to a red heat and permitted to cool very gradually in a long tunnel or leer.

Leers generally receive glass vessels from a series of molding or fabricating machines. Usually it is possible to anneal in a single leer ware from two or three forming machines. Since the fabricating machines and the leers are extremely large and relatively immovable, it is desirable to connect them by means of conveyors. If manual labor is utilized either in putting the vessels on the conveyors or removing them from the conveyors to the leer, the cost of manufacture is materially increased.

Various devices have been devised for mechanically transferring the vessels and delivering them to the conveyor in the leer. Some of these raise the vessels individually and place them in the leer. Others utilize chutes, and still others attempt to push groups of vessels from the conveyor into the leer. These various devices, because of their complicated mechanisms, are so difficult to operate and have such a high initial cost that many glass factories use manual labor for transferring the vessels. It must be remembered that glass machinery runs twenty-four hours a day and hence a single additional laborer actually means three additional men added to the payroll.

The present invention aims to overcome the difficulties of the prior art devices by providing a device simple and effective in operation which will automatically transfer vessels from a conveyor into a leer as they are delivered by the conveyor. The glass vessels initiate the successive cycles of operation and hence the device operates only when there is a full line of vessels to be moved into the leer. The horizontal bar or pusher aligns the vessels transversely of the leer to afford a neat compact load.

An object of the invention is to provide a device adapted to move a group of vessels from a conveyor into a leer, and to initiate the cycle of operation of said device by the vessels to assure its operation only when there is a full line on the conveyor.

Another object of the invention is to simplify existing transferring devices, to reduce their cost materially, and to increase their effectiveness and reliability.

Another object of the invention is to provide an efficient practical device for loading leers readily applicable to the present glass factory machinery.

A still further object of the invention is to provide such a device having a bar or pusher movable horizontally to push the vessels into the leer and movable vertically to clear the incoming vessels on the conveyor during its return movement.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings; wherein Fig. 1 is a sectional view of the transferring mechanism and the end of the leer on the line 1—1 of Fig. 2; certain parts being shown diagrammatically;

Figure 1:
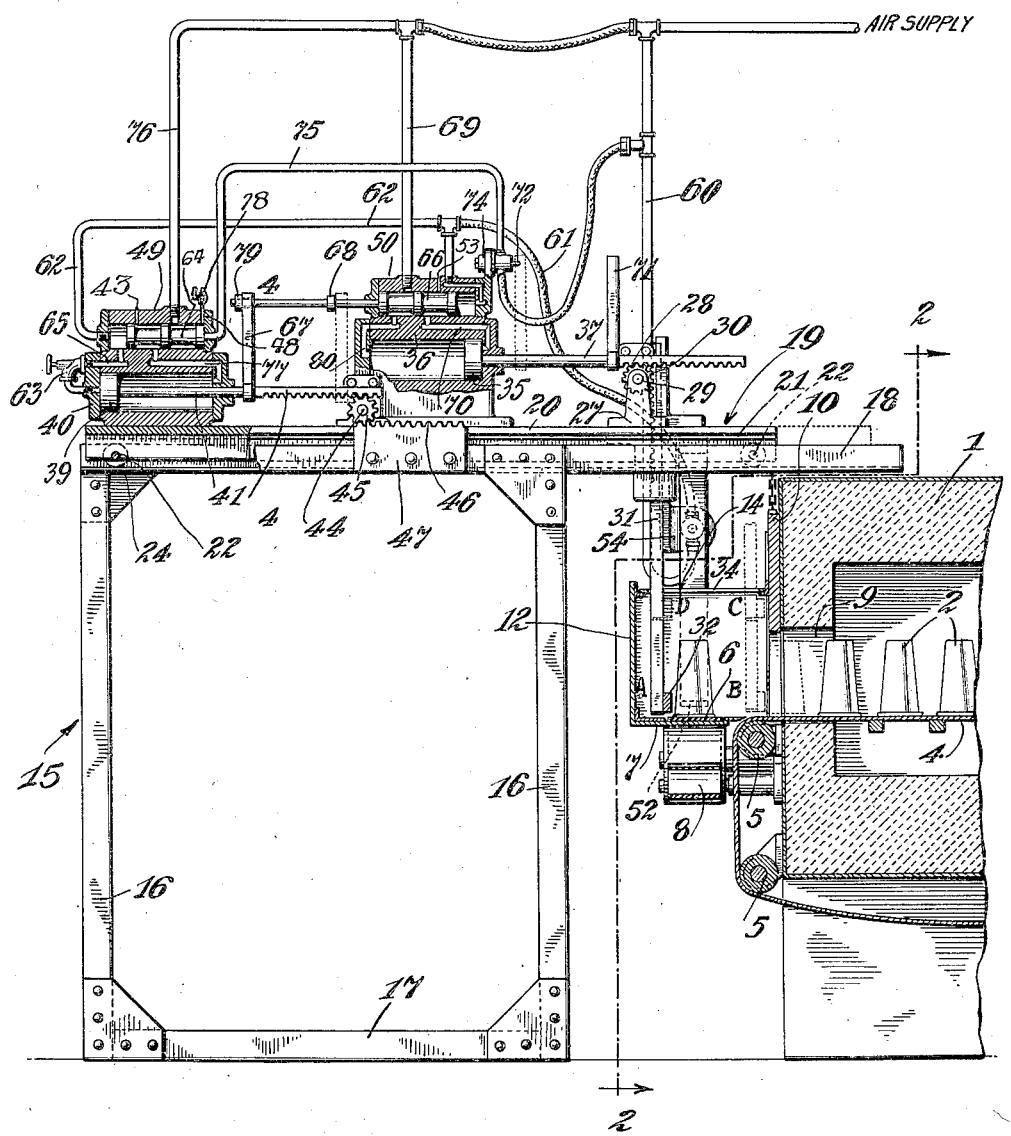
Figure 2:
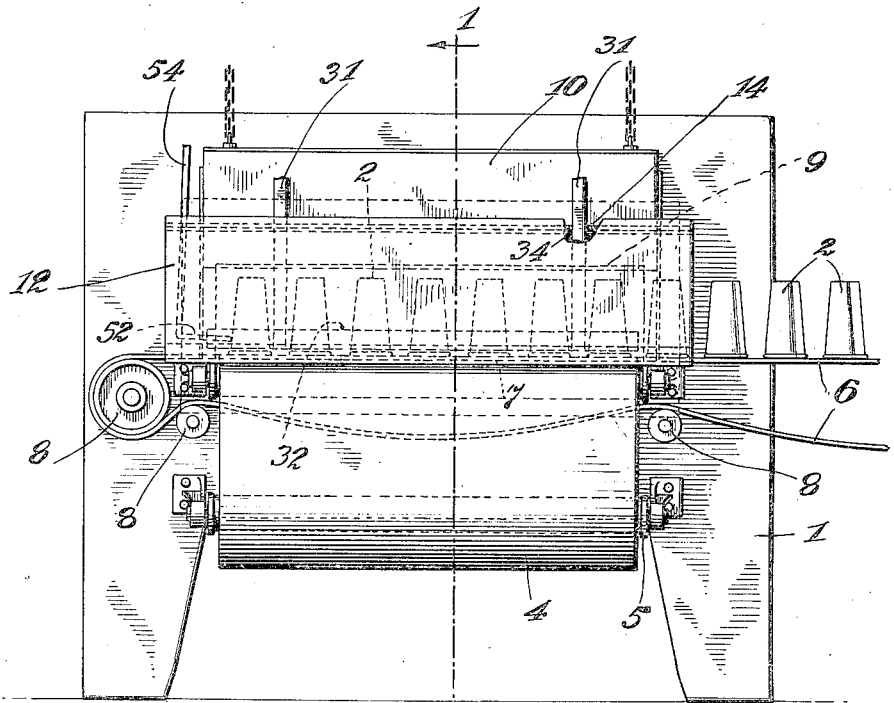
Fig. 2 is an end view of the leer taken on the line 2—2 of Fig. 1.

Referring more particularly to the drawings, there is shown a leer 1 for annealing glassware, such as vessels 2 resting upon the conveyor 4 which is mounted on the rollers 5 and extends outside of and below the bottom of the leer. Mounted transversely of the leer and at the end thereof, is a narrow conveyor 6 resting upon a suitable support 7 and extending over suitable pulleys 8. This conveyor may connect directly with a fabricating machine but preferably connects with one or more conveyors leading from the fabricating machines, the respective conveyors being connected through the intermediation of a rotating disc which acts as a means for reducing the space between the vessels. In other words, by reducing the speed of the rotating disc intermediate the conveyors, it is possible to make the respective vessels substantially contact with each other as they are transferred to the conveyor 6.

The end of the leer has an opening 9 through which the conveyor 4 moves with vessels thereon. The size of this opening in the leer may be controlled by the gate 10, whereby the opening is just sufficiently large to admit the vessels in order to minimize air currents. In addition, a boxlike structure is provided outside of the leer with the conveyor belt 6 traversing the bottom of the structure. This structure may comprise the support 7 as a bottom, the conveyor belt 6 running thereover, with a side 12 and a removable cover 14. The box is closed at both ends but one end is provided with a small opening to admit the vessels on the narrow conveyor. It will be seen that the vessels move in a continuous line on the conveyor 6 into the boxlike structure and present a line of vessels adjacent the end of the wide conveyor 4 in the leer.

Figure 4:
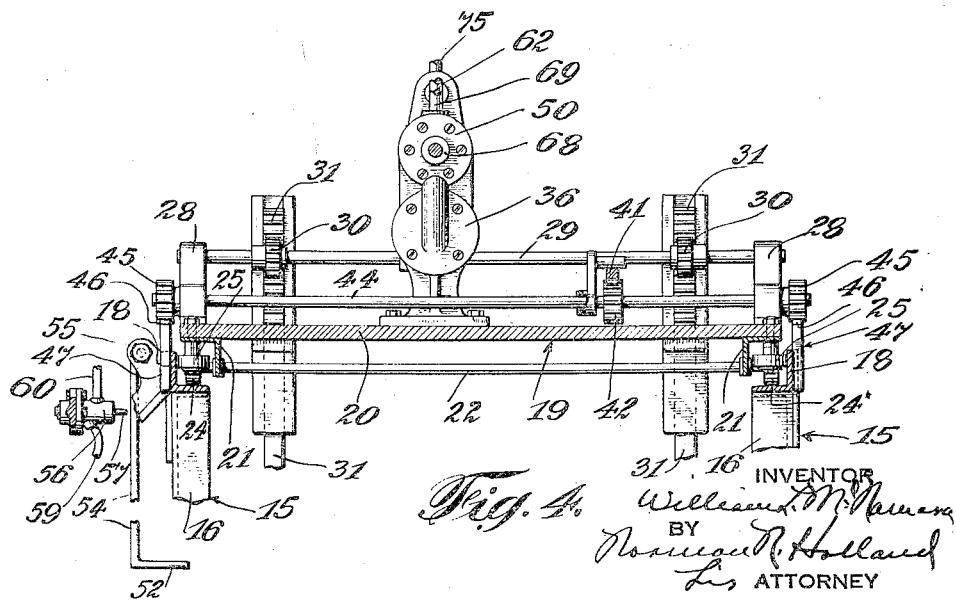
Fig. 4 is a sectional view on the line 4—4 of Fig. 3.

For the purpose of transferring the vessels thus presented into the leer there is provided adjacent the end of the leer a supporting structure 15 which may comprise vertical angle irons 16 with their lower and upper ends riveted to horizontal angle irons 17 and 18, respectively. The latter form a pair of runways for a carriage 19 which supports the various operating mechanisms about to be described. The carriage 19 may be of any suitable construction but preferably comprises a plate 20 having secured at its respective sides angle irons 21 adapted to face and be adjacent to the angle irons 18 as shown in Fig. 4. The depending parts of the irons 21 have bearings formed therein adapted to receive shafts 22 having rollers 24 adapted to engage the horizontal flange of the angle irons 18 which form a runway therefor. It will be noted that the mounting of the carriage is such that it moves freely in a horizontal direction on the rollers 24. If desirable additional rollers 25 may be provided and mounted on vertical axes to engage the vertical flanges of the irons 18 and thereby prevent lateral movement of the carriage.

Mounted at the forward end of the carriage 19 is a pair of brackets 27 having bearings 28 adapted to accommodate a shaft 29. A pair of pinions 30 mesh with corresponding racks or vertical bars 31. The lower ends of the bars 31 carry a horizontal bar or pusher 32, the front face of which may be covered with asbestos for engagement with the line of vessels on the narrow conveyor 6. The bars 31 extend through suitable slots 34 in the cover 14 of the boxlike structure enclosing the end of the leer. By means of the slots 34 the pusher 32 may be moved laterally forward and may likewise be moved vertically upward. The vertical movement of the pusher is secured by means of a pneumatic cylinder 36, having a piston 35 connected to a rack 37 meshing with a pinion 38 on the shaft 29. When the piston moves to the right the pusher bar 32 is moved downwardly, and when it moves to the left, the pusher bar is moved upwardly.

The horizontal movement of the pusher bar 32 is secured by a forward movement of the entire carriage 19 together with the operating mechanisms thereon. A second cylinder 40 effects this movement by means of the piston 39 connected to a rack or piston rod 41 meshing with a pinion 42 on shaft 44. A pair of gears 45 on the ends of shaft 44 mesh with suitable gear teeth 46 in the plates 47 bolted to the sides of the stationary angle irons 18. When the piston 39 moves to the right the entire carriage moves forward toward the leer and the pusher 32 moves vessels from the conveyor 6 into the leer. When the piston 39 moves to the left the carriage 19 moves away from the leer returning the pusher bar 32 to its original position.

To operate the cylinders 36 and 40 in timed relation to each other there is provided a pair of control valves 49 and 50. For convenience, these control valves are shown mounted upon the respective cylinders. The commencement of each cycle of operation may be effected by means of a trip adapted to be engaged by the forward vessel on the conveyor 6.

Figure 5:
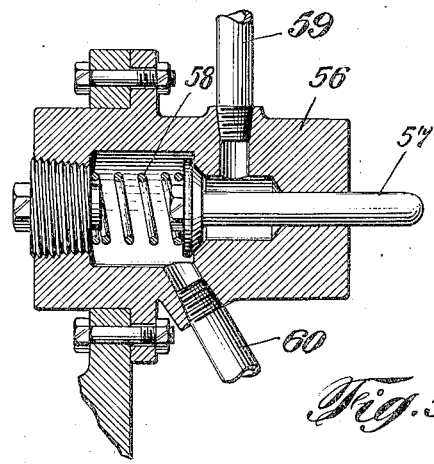
Fig. 5 is a sectional view of one form of trip valve.
Figure 3:
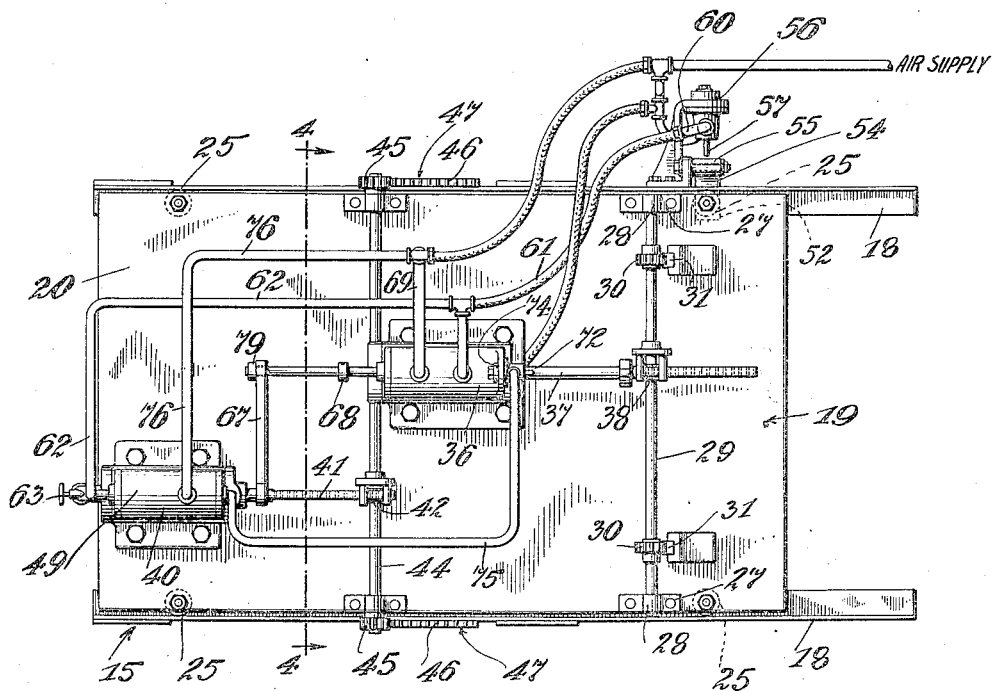
Fig. 3 is a top plan view with certain parts omitted for clearness.

This trip preferably comprises a long vertical arm 54 pivoted at 55 and having a member 52 at its lower end adapted to be engaged by the forward vessel. A trip valve 56 with a stem 57 is provided adjacent the upper end of the arm 54 to give a maximum leverage so that a very slight force on the member 52 will effect its operation. A detail of the valve is shown in Fig. 5 wherein the valve stem 57 is held in position by a spring 58 and air enters from pipe 60 and leaves through the tube 59.

When the forward vessel strikes the member 52 the valve stem 57 is pressed inwardly admitting air to the tube 59 which is connected through tubes 61 and 62 to the left end of the control valve 49 and to the right end of the control valve 50, respectively. The admission of air to the left end of the control valve 49 forces the piston 64 therein to the right, admitting air to the left end of the cylinder 40 through conduit 65 and a reduction valve 63. The position of the control valve vents the right end of the cylinder 40 to atmosphere through conduit 77 and aperture 43 to facilitate the movement of the piston 39. The movement of the piston 39 to the right in Fig. 1 moves the entire carriage 19 by means of pinion 45 to the right and pusher bar 32 from the position A to the position B (see Fig. 1). The admission of air through the pipe 62 to the right end of the control valve 50 holds the valve piston 66 in its proper position as shown in Fig. 1 in opposition to any frictional forces created by arm 67. As the piston rod 41 and the carriage 19 move to the right the arm 67 engages the projection 68 on the stem of the valve piston 66 and moves the piston to its extreme right position admitting air from the tube 69 through conduit 70 to the right end of the cylinder 36 which moves the piston rod 37 to the left raising the vertical arms 31 and the pusher bar 32 from the position B to the position C so that the pusher bar 32 is above the vessels 2 and may be returned without affecting the incoming vessels on the conveyor 6. While the piston 35 is moving to the left the air may exhaust from the left end of the cylinder through conduit 80 and around the valve piston rod which fits loosely in its bearing. When the piston rod 37 has moved to its extreme left position an arm 71 thereon engages valve stem 72 of a trip valve 74 which may be similar to the trip valve shown in Fig. 5. This causes air to be admitted through tube 75 to the right end of the control valve 49 moving the piston therein to its extreme left position and admitting air through tube 76 and conduit 77 to the right end of the cylinder 40, the left end of the cylinder being open to atmosphere through conduit 65 and aperture 43. This moves the piston rod 41 to the left which in turn rotates the gears 42 moving the carriage 19 to the left and also the pusher 32 bringing the pusher from the position C to the position D. As the piston 39 reaches its extreme left position the arm 67 thereon engages a projection 79 on the stem of the control valve piston 66 and moves the piston to its extreme left position as shown in Fig. 1. This admits air through the tube 69 and conduit 80 to the left end of the cylinder 36 moving the piston rod 37 to the right and lowering the pusher bar 32 to its initial position as shown at A in Fig. 1. The movement of the piston to the right is facilitated by its right end being open to atmosphere through conduit 70 and aperture 53. The parts rest in this position until the forward vessel again engages the member 52 to initiate a further cycle of operation. To facilitate the return of the valve 64 to the right as shown in Fig. 1 a small bleed aperture 48 is provided at the extreme right end of the control valve 49 whereby any pressure in the air tube 75 may escape. The aperture 48 is provided with a small valve 78 for regulating the escape of air.

The operation of the device will be clear from the preceding description. The pusher bar 32 by the movement of the carriage 19 to the right is moved from position A to position B and carries with it the line of vessels on the conveyor 6, moving them onto the conveyor 4 in the leer. Thereafter the cylinder 36 is operated to raise the pusher 32 from the position B to the position C which is above the top of the vessels 2. The cylinder 40 is then operated to move the carriage 19 to the left carrying the pusher bar 32 from the position C to the position D. The cylinder 36 is again operated to move the piston rod 37 to the right thereby returning the pusher bar 32 from the position D downwardly to the position A ready for a second cycle of operation.

It will be seen that the present invention provides a device which is simple in construction and effective in operation and which consists of a minimum number of parts readily obtainable in the ordinary glass factory. Air is prevented from entering the leer to disturb the temperature conditions therein. The device is automatically responsive to the position of the line of vessels and hence operates only when a full line is present. The horizontal bar not only transfers the vessels into the leer but actually aligns them transversely thereof. By pneumatically operating the various mechanisms, the speed of movement at the beginning and end of the operations may be accurately controlled by means of reduction valves and the like. All the parts are rugged in construction and are fully capable of withstanding the rough usage to which they may be subjected.

As various changes may be made in the above embodiment without departing from the spirit of the invention, it is to be understood that all matter herein is to be interpreted as illustrative and not in a limiting sense as the scope of the invention is defined in the claims.

Having thus described my invention, I claim:

1. In a device of the class described, the combination of a leer for glassware and the like having a conveyor extending therethrough, a second conveyor extending transversely of the end of said leer, means for closing the space about said second conveyor whereby the end of said leer will be substantially closed, one end of said enclosure having an aperture therein for permitting vessels to pass on said conveyor into said enclosure, and means extending through the roof of said boxlike structure for transferring said vessels from said enclosure into said leer without exposing the tunnel in said leer to draughts.

2. In a device of the class described, the combination of a leer, a boxlike enclosure at the end of said leer, said enclosure having an opening to permit the entrance of vessels therein, a conveyor extending along the bottom of said structure for conveying vessels through said opening, means within said boxlike structure for transferring a plurality of aligned vessels simultaneously in upright position from said conveyor into said leer, and devices extending through the upper side of said boxlike structure for operating said means.

3. In a device of the class described, the combination of a leer having a boxlike enclosure on the end thereof, a conveyor for carrying vessels into said enclosure, a horizontal bar for pushing the vessels from said conveyor into said leer, and means extending upwardly through the roof of said enclosure for operating said bar, said means being actuated by the forward vessel on said conveyor.

4. In a device of the class described, the combination of an enclosure for the end of a leer, a conveyor for conveying vessels in upright position in a single line into said enclosure, a bar extending longitudinally of said conveyor for transferring a line of vessels from said conveyor into said leer, and devices extending through the roof of said enclosure for pushing said bar forward to transfer the vessels into the conveyor, for raising said bar to clear the incoming line of vessels and for returning it to its initial position for engagement with an additional line of vessels.

5. In a device of the class described, the combination of an enclosure for enclosing the end of a leer, a conveyor for transferring vessels in a single line into said enclosure, a horizontal bar extending along said conveyor, means extending upwardly from said bar through transverse slots in the upper part of the enclosure, and devices for engaging said means to impart a forward motion to said bar, an upward motion, a rearward and downward motion to transfer successive lines of vessels into said leer.

6. In a device of the class described, the combination of means for engaging a line of vessels to transfer same into a leer or the like, devices actuated by the forward vessel in said line of vessels for automatically imparting a forward motion to said means when a line of vessels is presented, and mechanism for automatically raising said means and returning same to its initial position without deranging the incoming line of vessels.

7. In a device of the class described, the combination of a conveyor extending transversely of the end of a leer, a pusher extending longitudinally of said conveyor, pneumatic means actuated by the vessel on the forward end of said conveyor for imparting a forward movement to said pusher, and devices actuated by said pneumatic means for raising said pusher at the end of its forward movement so that it can be returned without disturbing the incoming vessels.

8. In a device of the class described, the combination of a conveyor extending transversely of the end of a leer for moving a line of vessels continuously, a pusher extending longitudinally of said conveyor, pneumatic means actuated by the line of vessels for giving a forward motion to said pusher, and pneumatic devices actuated by said means for raising said pusher at the end of the stroke so that it may be returned to its initial position without disturbing the incoming vessels on the conveyor.

9. In a device of the class described, the combination of a conveyor extending transversely of the end of a leer for moving vessels continuously across said end, a pusher extending longitudinally of said conveyor, and means actuated by the forward vessel on said conveyor for imparting consecutively a forward movement to said pusher to push said vessels into said leer, an upward movement over said incoming vessels and a downward movement to its initial position.

10. In a device of the class described, the combination of a member for pushing vessels from a conveyor into a leer, a carriage supporting said member, means for reciprocating said carriage horizontally to move said pusher, and devices for moving said pusher in a vertical direction at the termination of the horizontal movement of said carriage.

11. In a device of the class described, the combination of a pusher for transferring vessels from a conveyor into a leer, a carriage supporting said pusher, pneumatic means for reciprocating said carriage in a horizontal direction, pneumatic devices for moving said pusher in a vertical direction, said pneumatic devices being actuated by said pneumatic means.

12. In a device of the class described, the combination of a pusher for transferring vessels from a conveyor into a leer, a carriage supporting said pusher, a pair of air cylinders mounted on said carriage, one of said air cylinders being adapted to reciprocate said carriage in a horizontal direction, the other of the said air cylinders being adapted to reciprocate said pusher in a vertical direction whereby successive rows of vessels are transferred into the leer.

13. In a device of the class described, the combination of a pusher for transferring vessels from a conveyor into a leer, a pair of air cylinders, one of said cylinders being adapted to reciprocate said pusher in a horizontal position, the other of said air cylinders being adapted to reciprocate said pusher in a vertical direction, and means actuated by the forward vessel on said conveyor for admitting air into one end of said first cylinder to initiate the cycle of movement of said pusher.

14. In a device of the class described, the combination of a pusher for transferring vessels from a conveyor into a leer, a carriage, a pair of vertical arms secured to said carriage, a pusher secured to said vertical arms, a pair of cylinders on said carriage, the first cylinder being adapted to impart horizontal motion to said pusher and the second cylinder being adapted to impart vertical motion thereto, and an air trip actuated by the forward vessel on the conveyor for admitting air to one end of said first cylinder for initiating the cycle of movement.

15. In a device of the class described, the combination of means for transferring vessels from a conveyor into a leer, a carriage suspending and supporting said means, devices for reciprocating said carriage horizontally to move said means, and devices for moving said means in a vertical direction at the termination of the horizontal movement of said carriage.

16. In a device of the class described, the combination of means for transferring vessels from a conveyor into a leer, a carriage supporting said means, pneumatic means for reciprocating said carriage in a horizontal direction, and devices for moving said first named means in a vertical direction, said devices being operated by said pneumatic means.

17. In a device of the class described, the combination of a pusher adapted to engage vessels at only one side thereof and to slide them from a conveyor into a leer, a carriage for supporting said pusher, and mechanism for moving said carriage to move said pusher thereby to push the vessels into the leer, said mechanism being attached to and movable with said devices.

WILLIAM L. McNAMARA.